(12) United States Patent  
Bostrom et al.

(10) Patent No.: US 7,796,617 B1  
(45) Date of Patent: Sep. 14, 2010

(54) METHOD FOR PROVIDING PROTOCOL AGGREGATION AS AN END-TO-END SERVICE ACROSS A TUNNELING NETWORK

(75) Inventors: Hans Henrik Bostrom, Sunnyvale, CA (US); Senthil Arunachalam, Fremont, CA (US); Sze-wa Lao, Palo Alto, CA (US); Srinath Venkatesan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 948 days.

(21) Appl. No.: 10/785,458

(22) Filed: Feb. 23, 2004

(51) Int. Cl.  
*H04L 12/28* (2006.01)

(52) U.S. Cl. ........................ 370/401; 370/465

(58) Field of Classification Search ............... 370/254, 370/351, 395.5, 465, 389, 401; 718/105  
See application file for complete search history.

(56) References Cited

U.S. PATENT DOCUMENTS

| | | | | |
|---|---|---|---|---|
| 5,081,621 | A * | 1/1992 | Sugimoto | 370/401 |
| 5,742,604 | A | 4/1998 | Edsall et al. | 370/401 |
| 5,959,968 | A | 9/1999 | Chin et al. | 370/216 |
| 6,501,749 | B1 * | 12/2002 | Alexander et al. | 370/351 |
| 6,665,301 | B1 * | 12/2003 | Wu | 370/395.41 |
| 6,765,881 | B1 * | 7/2004 | Rajakarunanayake | 370/256 |
| 6,910,149 | B2 * | 6/2005 | Perloff et al. | 714/4 |
| 7,002,927 | B2 * | 2/2006 | Guruprasad | 370/255 |
| 7,031,341 | B2 * | 4/2006 | Yu | 370/469 |
| 7,061,875 | B1 * | 6/2006 | Portolani et al. | 370/256 |
| 7,519,056 | B2 * | 4/2009 | Ishwar et al. | 370/389 |
| 2002/0012345 | A1 * | 1/2002 | Kalkunte et al. | 370/389 |
| 2004/0017816 | A1 * | 1/2004 | Ishwar et al. | 370/395.53 |
| 2006/0067317 | A1 * | 3/2006 | Engstrand et al. | 370/389 |
| 2006/0251085 | A1 * | 11/2006 | Kalkunte et al. | 370/400 |
| 2007/0002857 | A1 * | 1/2007 | Maher | 370/389 |

* cited by examiner

*Primary Examiner*—Ricky Ngo  
*Assistant Examiner*—Christine Ng  
(74) *Attorney, Agent, or Firm*—Weaver Austin Villeneuve & Sampson, LLP

(57) ABSTRACT

Data transmission across a computer network is disclosed, comprising creating a plurality of tunnels across a computer network to connect a first computer to a second computer, the plurality of tunnels including a tunnel for each link in a link aggregation of a plurality of transmission protocols, connecting a first computer at a first site with a second computer at a second site, the connection made via the computer network, and transmitting packets end-to-end from the first computer to the second computer in a manner characterized that the computer network preserves a connection from the first computer to the second computer without terminating the connection at the inbound edge of the computer network, the packets conforming to protocols in the plurality of transmission protocols.

32 Claims, 2 Drawing Sheets

METHOD FOR PROVIDING PROTOCOL AGGREGATION AS AN END-TO-END SERVICE ACROSS A TUNNELING NETWORK

FIELD OF THE INVENTION

The present invention relates broadly to a computer network serving data transmission functions between geographically separated customer sites. More specifically, the present invention relates to providing data transmission connections end-to-end across an interne service provider computer network.

BACKGROUND OF THE INVENTION

Business customers of Internet service providers (ISPs) desire transparent tunneling of port aggregation protocol (PAgP) packets through the use of Layer 2 protocol tunneling (L2PT) techniques. This need arises from the need to connect ports of a same Etherchannel between different edge switches of the ISP network to increase availability. Such functionality would allow emulation of point-to-point connection of Etherchannel ports through an ISP network without dedicated lines, thus maximizing network usage.

However, current applications lack flexibility. For example, tunneling of link aggregation control protocol (LACP), and unidirectional link detection (UDLD) is not supported. In typical ISP networks, the point-to-point nature of the protocol semantics of UDLD, PAgP and LACP present L2PT requirements that are not supported by prior-art L2PT frameworks that are designed for handling multicast types of protocols, such as spanning tree protocol (STP).

L2PT is built on top of ISP access VLAN tagging schemes. ISP access VLAN tagging enables ISPs to segregate traffic to and from different customers in the ISP's infrastructure while the customers may appear to be on the same VLANs. Interfaces on the customer networks directed toward the ISP are typically configured as 802.1Q trunks and the interfaces on the edge switches towards the customer networks are typically configured as non-trunking interfaces to create an asymmetric link. Asymmetric links on the ISP side are configured with access VLANs that are unique to each customer.

Typically, the frames coming out from the customer networks are 802.1Q tagged with appropriate VLAN information. Each tag is preserved when the frame enters the edge switches in the ISP cloud. Upon exiting the edge switches into the ISP cloud, the frame is double-tagged with outer tag identifying the customer's access VLAN and the inner VLAN identifying the VLAN of the incoming traffic. The core switches inside the ISP infrastructure forward the traffic as normal Ethernet-tagged frames. Upon exiting the edge switch from the ISP towards the customer networks, the outer tag is stripped and the frame is sent out as regular 802.1Q tagged frame so that the original VLAN numbers in the customer networks are recovered. If traffic coming out of the customer network is not tagged, such as in the case of native VLAN frames, then these packets are bridged or routed as if they were normal packets. These packets entering the ISP infrastructure have only a single tag, which is a customer-specific access VLAN tag.

The above concept can be extended in a hierarchical manner, with border switches performing the double-tagging and the innermost switches in the ISP infrastructure performing the multiple tagging. The amount of multiple tagging that can be supported depends on the maximum length of the Ethernet frame that the hardware can handle.

L2PT allows switches on the inbound side of the ISP infrastructure to encapsulate protocol packets with a special MAC address and send them across the ISP infrastructure. Edge switches on the outbound side of the ISP infrastructure decapsulate the protocol packets and send them to a customer network. Core switches inside the ISP infrastructure forward these packets as normal packets without performing any processing on the packets. Thus, the ISP infrastructure is transparent to the customer network.

When Layer 2 protocol packets enter the tunnel port on the inbound switch, the destination MAC address of the L2 protocol packet is replaced with tunnel MAC (0100.0ccd.cdd0) and forwarded to all trunk ports. These packets also are double-tagged with an outer tag being the customer's access VLAN tag and the inner tag being the customer-specific VLAN tag. The core switches forward these packets to all the ports in the same metro VLAN without performing any processing on the packets. The edge switches on the outbound side restore the proper L2 protocol MAC and forward them to tunnel ports in the same metro VLAN. Thus, the L2 protocol packets are kept intact and delivered to other side of the customer network across the ISP infrastructure.

Referring to FIG. 1, Corp A and Corp X are connected to access VLANs R and G, respectively, and asymmetric links are created towards the networks in Site1. The Layer 2 protocol packets (for example LACP packets) coming into S1 from Corp A in Site 1 are forwarded into the ISP infrastructure as double-tagged packets with a destination MAC address set to the tunnel MAC address. These double-tagged packets have the outer VLAN tag as R and the inner tag as (for example) 100. When these double-tagged frames reaches S3, the outer VLAN tag R is removed, the tunnel MAC address is replaced with the respective Layer 2 protocol MAC and the frames are sent out to Corp A on Site 2 as single-tagged frames (i.e. with a tag reading VLAN 100).

The ISP access VLAN tagging scheme also can be enabled in access ports. In such an application, the encapsulation and de-encapsulation behavior are the same as above, except that these packets in the ISP aren't double-tagged. The single tag is customer-specific access VLAN tag.

SUMMARY

In one aspect, the present invention provides a method of providing data transmission across a computer network. The method comprises creating a plurality of tunnels across a computer network to connect a first computer to a second computer, where the plurality of tunnels includes a tunnel for each link in a link aggregation of a plurality of transmission protocols. A connection is established through the computer network between a first computer at a first site with a second computer at a second site using the plurality of tunnels. Packets are transmitted end-to-end from the first computer to the second computer in a manner characterized that the computer network preserves a connection from the first computer to the second computer without terminating the connection at the inbound edge of the computer network, with the packets conforming to protocols in the plurality of transmission protocols. In embodiments, the plurality of transmission protocols includes the LACP and PAgP protocols, and packets are transmitted in accordance with these protocols to perform Ethernet loadsharing across multiple links. In an embodiment, the plurality of transmission protocols comprises the UDLD protocol, and packets are transmitted in accordance with the UDLD protocol to perform unidirectional link detection. A unique ISP access VLAN is assigned to each connection between corresponding Etherchannel ports. In an embodiment, the computer network of the present invention is configured to detect multipoint protocol tunneling. The monitoring can be performed on a per-interface basis, a per-protocol basis, or a per-port basis. The monitoring can be performed by examining a source media access control address on a transmitted protocol data unit. The source media access control address is recorded as a multipoint protocol tunneling reference, and an aging timer is set to a minimum time that is longer than a longest expected transmission time for the transmitted protocol data unit. Before expiration of the aging timer, all packets arriving with a source media access control address other than the reference are dropped. After expiration of the aging timer, the first packet arriving after expiration of the aging timer provides its source media access control address as the next multipoint protocol tunneling reference.

Embodiments of the present invention include computer program products and network systems that encompass the functionality of the present invention. Many other features and advantages of the present invention will be realized from reading the following detailed description in conjunction with the drawings, in which:

DETAILED DESCRIPTION

Figure 1:
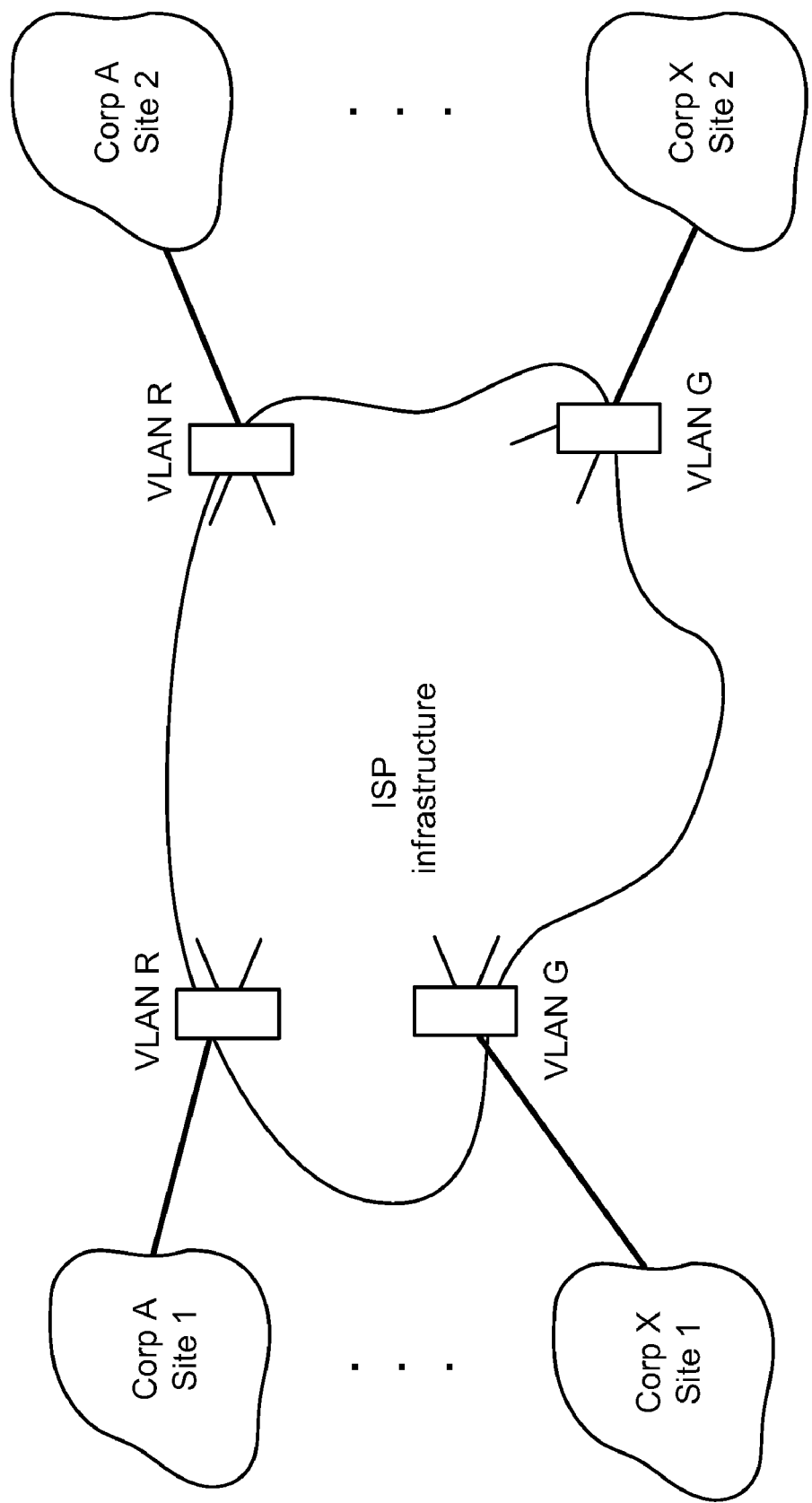
FIG. 1 illustrates a prior-art ISP network configuration.
Figure 2:
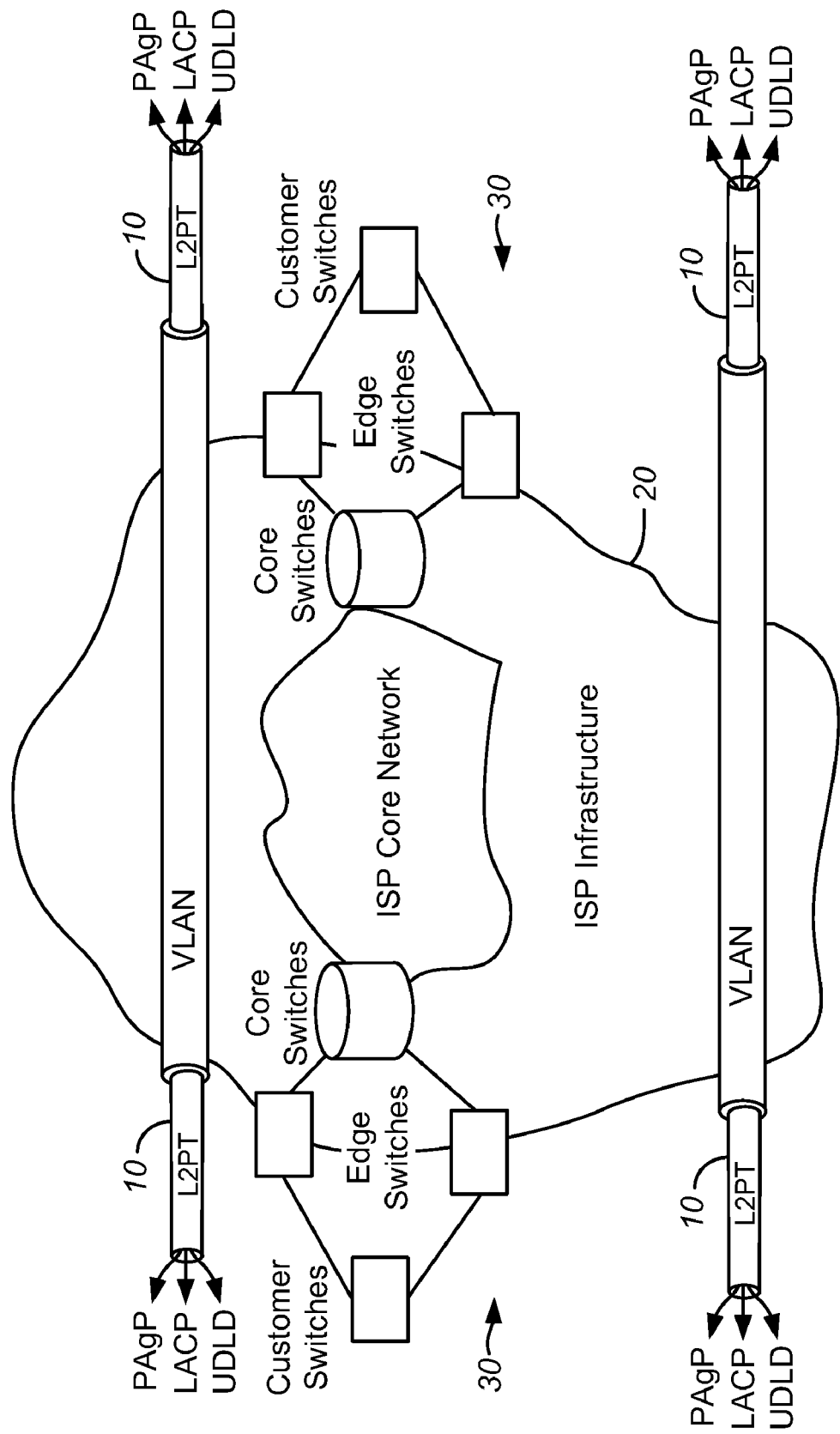
FIG. 2 illustrates a network in accordance with the present invention.

Directing attention to FIG. 2, in an embodiment, the present invention creates a plurality of separate tunnels 10 through an ISP's network 20, one for each link in the UDLD, IEEE 802.ad and/or PAgP link aggregation, and transport LACP, PAgP and/or UDLD packets to opposite ends of the tunnel using L2 tunneling protocol techniques. In an embodiment, LACP, PAgP protocol packets are used for Ethernet load sharing across multiple links, whereas UDLD is used for unidirectional link detection. These protocols play a vital role from an ISP customer 30's point of view when they are deployed. Using the present invention, ISPs can provide its customers with end to end UDLD, IEEE 802.3as and/or PAgP link aggregation using existing ISP infrastructure previously used for providing conventional transparent LAN service where link aggregation is used to access the transparent LAN service.

Performing data transmission on a tunneled protocol basis allows more flexibility in terms of maintaining point-to-point connections. In embodiments of the present invention, both LACP and UDLD are enabled as tunneled protocols. In an embodiment, a timer is maintained on per-protocol basis. If for some reason if transmission using the UDLD protocol crashes, the LACP connection can be maintained, unlike in a per-port basis.

Creating virtual cables through a network provides a transparent LAN service. A significant challenge overcome by the present invention is to process the bundle of connections from one side of an ISP network to the other. Normally, in prior-art applications, the Etherchannel connection is terminated at one end of an ISP's network. For example, if a business customer is connected to an ISP, and wants to connect via the ISP to same business located at another site, the client prefers to form a tunnel across the ISP to the other site with the appearance of being a private network. In typical ISPs, the connection the customer is trying to make on the first hop (the ISP side) is terminated on the ISP side and ISP switches determine how the data is routed.

In contrast, the present invention preserves the connections in separate channels from end to end across the ISP network. The present invention provides a point-to-point topology within the ISP network, emulating cables that connect individual Etherchannel member ports on customer switches across the ISP network. UDLD, PAgP and LACP exchange protocol data units (PDUs) between each pair of customer switch ports in the Etherchannel through these virtual cables. Once an Etherchannel has been formed between two customer switches across the ISP network, the dynamic load distribution function of the Etherchannel protects the availability of the transparent LAN service between the two customer switches against equipment failures within the ISP network which might result in breaking one or more of the virtual cables connecting the Etherchannel ports. Note that the present invention is not to be confused with the formation of Etherchannels between a customer switch and the ISP edge switch in which there is no L2PT involved.

The present invention provides a method of network provisioning to enable a point-to-point connection across an ISP network between two corresponding ports in an Etherchannel. This aspect of the present invention also results in network operation that safeguards against error conditions within the ISP network that violates the point-to-point topology required by UDLD, PAgP and LACP. Another benefit is that the present invention results in network operation that dynamically adapts to changes in a customer network's Etherchannel configuration.

The present invention assigns a unique ISP access VLAN to each virtual cable that connects the corresponding Etherchannel ports. For example, for a four member Etherchannel, the customer must be assigned four unique ISP access VLANs in order to segregate the point-to-point protocol traffic within each "virtual" cable. This method of network provisioning differs significantly from that of typical L2PT network provisioning schemes for multicast protocols where each customer is assigned only one unique ISP access VLAN.

Erroneous network configuration that allows tunneled point-to-point protocol packets to be delivered to many points can lead to serious network issues in the ISP customer's network. Point-to-point tunneled protocols are designed to work between two end points. The presence and participation of a third end point in the protocol interaction can result in the entering an error state in the tunneled protocol's finite state machine, which can in turn lead to disabling of the tunneled protocol together. In the case of LACP or PAgP, this could lead to inability to perform bundling of Etherchannel ports. To decrease link down detection time, UDLD is enabled whenever tunneling of PAgP or LACP is configured.

In an embodiment, the present invention provides a mechanism to detect problems due to multipoint protocol tunneling (MPT). MPT detection is useful to prevent the serious issues described above that can arise when PDUs are sent to multiple end points. In an embodiment, MPT detection is enabled/disabled on a per-interface basis. If the user configures a point-to-point tunneled L2 protocol, MPT detection is automatically enabled. A user can also manually configure MPT detection. When MPT detection is enabled, the system monitors the source media access control (MAC) address of the packets coming out the L2PT tunnel. The source MAC address of the first tunneled PDU from a peer is recorded as an MPT detection reference, and an aging timer for the MPT detection reference is started. The aging timer is maintained in various embodiments on a per-port basis or a per-tunneled protocol basis. In an embodiment, the aging timer is set to a minimum time that is longer than the longest expected time for transmission of a PDU. A multiplier (such as twice the longest expected time for transmission of a PDU) can be used to allow for at least one retransmission of a PDU. In an embodiment, the multiplier is configurable by a user. If packet loss is unlikely to occur, then any value longer than longest expected tunneled protocol interval period is sufficient to safeguard against transient network conditions under which the tunneled PDUs might be dropped. Once a remote end point has been accepted as the tunneled protocol session partner for the local end point, that remote end point is considered to be the legitimate tunneled protocol session partner unless the remote end point does not comply with the tunneled protocol's transmit requirement consistently, for example, for at least twice the period of the longest tunneled protocol interval. While the MPT detection reference is not aged out (the local end point does not receive any tunneled protocol packets from the established remote end point during an aging timer period), all packets arriving with a source MAC address that differ from the MPT detection reference are dropped. In case the MPT detection reference is aged out, the source MAC address of the next valid packet is used as the new MPT detection reference. Thus the present invention also enables the customer switch to dynamically adapt to Etherchannel configuration changes in the customer network. A user interface is provided to allow the user to manually delete the MPT detection reference. For every n number of MPT detections, where n is a user-configurable MPT detection threshold, an error message is presented to the user and/or recorded in a system log.

Performing data transmission on a tunneled protocol basis allows more flexibility in terms of maintaining point-to-point connections. In embodiments of the present invention, both LACP and UDLD are enabled separately and in combination as tunneled protocols. In an embodiment, the MPT timer is maintained on per-protocol basis. If for some reason if transmission using the UDLD protocol crashes, the LACP connection can be maintained, unlike in a per-port basis.

Using a protocol-based MPT timer in accordance with the present invention, for example one timer for each active tunneled protocol on the port, provides more visibility into a system run-time operation. While this embodiment of the present invention provides the ability to track time out event even for tunneled protocols with shorter protocol intervals, but requires more system resources to implement a protocol-based MPT timer.

A port-based MPT timer may also be used in accordance with the present invention for minimizing resource requirements. However, since the longest protocol interval is used for the port-based timer, if the L2PT transmission is disabled for that protocol with a port-based timer the time out period needs to be adjusted to the next longest protocol interval in order to provide good system response throughout the network.

While embodiments of the present invention have been illustrated and described in detail, it is to be understood that many modifications can be made to various embodiments of the present invention without departing from the spirit thereof.

What is claimed is:

1. A method of providing data transmission across a public computer network, the method comprising:
    creating a plurality of tunnels across the public computer network to facilitate a link aggregation between a first computer at a first site and a second computer at a second site, the plurality of tunnels including a tunnel for each link in the link aggregation, said link aggregation implemented through the use of a plurality of transmission protocols;
    creating a point to point connection between the first computer and the second computer, the connection made in part via the tunnels created across the public computer network; and
    transmitting packets end-to-end from the first computer to the second computer, the packets conforming to protocols in the plurality of transmission protocols, in such a manner that data is transmitted from the first computer to the second computer without terminating the connection from the first computer to the second computer at a switch at an inbound edge of the public computer network.

2. The method of claim 1, wherein the plurality of transmission protocols comprises LACP protocol, and packets are transmitted in accordance with the LACP protocol to perform Ethernet loadsharing across multiple links.

3. The method of claim 1, wherein the plurality of transmission protocols comprises PAgP protocol, and packets are transmitted in accordance with the PAgP protocol to perform Ethernet loadsharing across multiple links.

4. The method of claim 1, wherein the plurality of transmission protocols comprises UDLD protocol, and packets are transmitted in accordance with the UDLD protocol to perform unidirectional link detection.

5. The method of claim 1, wherein a unique ISP access VLAN is assigned to each connection between corresponding link aggregation ports.

6. The method of claim 1, further comprising monitoring the computer network to detect multipoint protocol tunneling, wherein multipoint protocol tunneling comprises the presence and participation of one or more additional entities in a protocol exchange that is meant to occur between two end points.

7. The method of claim 6, wherein the monitoring is performed on a per-interface basis.

8. The method of claim 6, wherein the monitoring is performed by examining a source media access control address on a transmitted protocol data unit.

9. The method of claim 8, wherein the source media access control address is recorded as a multipoint protocol tunneling reference, and an aging timer is set to a minimum time that is longer than a longest expected transmission time for the transmitted protocol data unit.

10. The method of claim 9, wherein, before expiration of the aging timer, all packets arriving with a source media access control address other than the reference are dropped.

11. The method of claim 9, wherein, after expiration of the aging timer, the first packet arriving after expiration of the aging timer provides its source media access control address as the next multipoint protocol tunneling reference.

12. The method of claim 6, wherein a report is generated upon detection of multipoint protocol tunneling.

13. The method of claim 6, wherein multipoint protocol tunneling detection is performed on a per-protocol basis.

14. The method of claim 6, wherein multipoint protocol tunneling detection is performed on a per-port basis.

15. The method of claim 1, wherein said plurality of tunnels is formed in part by adding an outer VLAN tag to each packet at the inbound edge of the public computer network and removing the outer VLAN tag at an outbound edge of the public computer network, the outer VLAN tag corresponding to a tunnel and, for each of the plurality of tunnels, comprising a different VLAN value.

16. A non-transitory computer program product containing instructions which, when executed by at least one computer, provides data transmission across a public computer network by performing the acts of:

creating a plurality of tunnels across the public computer network to facilitate a link aggregation, the plurality of tunnels including a tunnel for each link in the link aggregation, said link aggregation implemented through the use of a plurality of transmission protocols;

creating a point to point connection between a first computer at a first site with a second computer at a second site, the connection made in part via the tunnels created across the public computer network; and transmitting packets end-to-end from the first computer to the second computer, the packets conforming to protocols in the plurality of transmission protocols in such a manner that data is transmitted from the first computer to the second computer without terminating the connection from the first computer to the second computer at a switch at an inbound edge of the public computer network.

17. The product of claim 16, wherein the plurality of transmission protocols comprises LACP protocol, and packets are transmitted in accordance with the LACP protocol to perform Ethernet loadsharing across multiple links.

18. The product of claim 16, wherein the plurality of transmission protocols comprises PAgP protocol, and packets are transmitted in accordance with the PAgP protocol to perform Ethernet loadsharing across multiple links.

19. The product of claim 16, wherein the plurality of transmission protocols comprises UDLD protocol, and packets are transmitted in accordance with the UDLD protocol to perform unidirectional link detection.

20. The product of claim 16, wherein a unique ISP access VLAN is assigned to each connection between corresponding link aggregation ports.

21. The product of claim 16, further comprising monitoring the computer network to detect multipoint protocol tunneling, wherein multipoint protocol tunneling comprises the presence and participation of one or more additional entities in a protocol exchange that is meant to occur between two end points.

22. The product of claim 21, wherein the monitoring is performed on a per-interface basis.

23. The product of claim 21, wherein the monitoring is performed by examining a source media access control address on a transmitted protocol data unit.

24. The product of claim 23, wherein the source media access control address is recorded as a multipoint protocol tunneling reference, and an aging timer is set to a minimum time that is longer than a longest expected transmission time for the transmitted protocol data unit.

25. The product of claim 24, wherein, before expiration of the aging timer, all packets arriving with a source media access control address other than the reference are dropped.

26. The product of claim 24, wherein, after expiration of the aging timer, the first packet arriving after expiration of the aging timer provides its source media access control address as the next multipoint protocol tunneling reference.

27. The product of claim 21, wherein a report is generated upon detection of multipoint protocol tunneling.

28. The product of claim 21, wherein multipoint protocol tunneling detection is performed on a per-protocol basis.

29. The product of claim 21, wherein multipoint protocol tunneling detection is performed on a per-port basis.

30. The computer program product of claim 16, wherein said plurality of tunnels is formed in part by adding an outer VLAN tag to each packet at the inbound edge of the public computer network and removing the outer VLAN tag at an outbound edge of the public computer network, the outer VLAN tag corresponding to a tunnel and, for each of the plurality of tunnels, comprising a different VLAN value.

31. A computer network for connecting computers at different private networks with each other, the computer network comprising:

means for creating a plurality of tunnels across the public computer network to facilitate a link aggregation, the plurality of tunnels including a tunnel for each link in the link aggregation, said link aggregation implemented through the use of a plurality of transmission protocols;

means for creating a point to point connection between a first computer at a first site with a second computer at a second site, the connection made in part via the tunnels created across the public computer network; and means for transmitting packets end-to-end from the first computer to the second computer, the packets conforming to protocols in the plurality of transmission protocols in such a manner that data is transmitted from the first computer to the second computer without terminating the connection from the first computer to the second computer at a switch at an inbound edge of the public computer network.

32. A method of providing data transmission across a public computer network, the method comprising:

receiving, at a switch at an inbound edge of the public computer network, packets from a plurality of links between the switch and a first computer located at a first private computer network, wherein the plurality of links comprise a link aggregation;

creating a plurality of tunnels across the public computer network to facilitate a link aggregation, the plurality of tunnels including a tunnel for each link the link aggregation;

assigning each of the plurality of links a tunnel from among the plurality of tunnels;

transmitting the packets from the first computer to a second computer at a second private network, a connection made between the first computer and the second computer across the public computer network via the created tunnels;

wherein the packets are transmitted from the first computer to the second computer without terminating the connection from the first computer to the second computer at the switch at the inbound edge of the public computer network, such that a point to point connection is established between the first computer and the second computer for each link of the link aggregation.

* * * * *